US012281200B2

(12) United States Patent
Ikeuchi et al.

(10) Patent No.: US 12,281,200 B2
(45) Date of Patent: Apr. 22, 2025

(54) FLUOROPOLYETHER GROUP-CONTAINING COMPOUND

(71) Applicant: DAIKIN INDUSTRIES, LTD., Osaka (JP)

(72) Inventors: Hideyuki Ikeuchi, Osaka (JP); Masato Naitou, Osaka (JP); Motoshi Matsui, Osaka (JP); Takashi Nomura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 558 days.

(21) Appl. No.: 17/679,282

(22) Filed: Feb. 24, 2022

(65) Prior Publication Data

US 2022/0177647 A1 Jun. 9, 2022

Related U.S. Application Data

(63) Continuation of application No. PCT/JP2020/034137, filed on Sep. 9, 2020.

(30) Foreign Application Priority Data

Sep. 26, 2019 (JP) .................................. 2019-176063

(51) Int. Cl.
| | |
|---|---|
| *C08G 65/333* | (2006.01) |
| *C08G 65/329* | (2006.01) |
| *C08G 65/331* | (2006.01) |
| *C08G 65/336* | (2006.01) |

(52) U.S. Cl.
CPC ..... *C08G 65/33396* (2013.01); *C08G 65/329* (2013.01); *C08G 65/331* (2013.01); *C08G 65/33317* (2013.01); *C08G 65/336* (2013.01)

(58) Field of Classification Search
CPC ... C08F 259/08; C09D 201/04; C09D 171/00; C09D 171/02; C09D 171/04; C08G 77/46; C08G 2650/48; C08G 65/007; C08G 65/331; C08G 65/329; C08G 65/336

See application file for complete search history.

(56) References Cited

U.S. PATENT DOCUMENTS

| | | | |
|---|---|---|---|
| 3,589,906 A | 6/1971 | McDowell | |
| 2004/0024249 A1 | 2/2004 | Picozzi et al. | |
| 2004/0068144 A1 | 4/2004 | Meo et al. | |
| 2012/0123049 A1* | 5/2012 | Koshikawa | C09J 171/00 |
| | | | 524/588 |
| 2014/0093737 A1 | 4/2014 | Shiraiwa et al. | |
| 2015/0307719 A1 | 10/2015 | Mitsuhashi et al. | |
| 2018/0186934 A1 | 7/2018 | Charlas et al. | |
| 2019/0218339 A1* | 7/2019 | Hoshino | C09D 171/02 |
| 2020/0115589 A1 | 4/2020 | Hoshino et al. | |
| 2020/0354520 A1 | 11/2020 | Mitsuhashi et al. | |
| 2021/0047540 A1 | 2/2021 | Hoshino et al. | |
| 2021/0095160 A1 | 4/2021 | Hoshino et al. | |
| 2021/0348024 A1 | 11/2021 | Matsuura et al. | |

FOREIGN PATENT DOCUMENTS

| | | |
|---|---|---|
| JP | H11-80312 A | 3/1999 |
| JP | 2004-67684 A | 3/2004 |
| JP | 2004-068007 A | 3/2004 |
| JP | 2014-70165 A | 4/2014 |
| JP | 2014-218639 A | 11/2014 |
| JP | 2016-108566 A | 6/2016 |
| JP | 2019-131807 A | 8/2019 |
| KR | 10-2015-0054147 A | 5/2015 |
| WO | 2009/008380 A1 | 1/2009 |
| WO | 2017/038830 A1 | 3/2017 |
| WO | 2018/043166 A1 | 3/2018 |
| WO | 2020/166488 A1 | 8/2020 |
| WO | 2020/241750 A1 | 12/2020 |

OTHER PUBLICATIONS

English Abstract and Machine Translation of TW 2009-22969 published Jun. 1, 2009.
International Search Report for PCT/JP2020/034137 dated Dec. 1, 2020.
International Preliminary Report on Patentability dated Mar. 15, 2021 with a Translation of the Written Opinion of the International Searching Authority in Application No. PCT/JP2020/034137.

(Continued)

*Primary Examiner* — Christopher M Rodd

(74) *Attorney, Agent, or Firm* — Suchrue Mion, PLLC

(57) ABSTRACT

A fluoropolyether group-containing compound of formula (1a) or formula (1b):

$$R^{F1}-\overset{O}{\underset{\|}{C}}-N\overset{R^1}{\underset{R^2}{\diagdown}} \tag{1a}$$

$$\underset{R^2}{\overset{R^1}{\diagdown}}N-\overset{O}{\underset{\|}{C}}-R^{F2}-\overset{O}{\underset{\|}{C}}-N\overset{R^1}{\underset{R^2}{\diagdown}} \tag{1b}$$

wherein $R^{F1}$, $R^{F2}$, $R^1$ and $R^2$ are as defined herein.

10 Claims, No Drawings

(56) References Cited

OTHER PUBLICATIONS

Extended European Search Report dated Jun. 23, 2023 in corresponding Application No. 20870110.2.
G. Caporiccio, et al., "Some physicochemical properties of perfluoropolyether surfactants" Journal of Colloid and Interface Science, Mar. 1984, vol. 98 Issue 1, 202-209 (4 pages).
Yukishige Kondo, et al. "Synthesis of Perfluoropolyethers Having a Functional Group at the Chain End and Their Adsorption Properties" Journal of the Japan Society of Colour Material, Nov. 20, 2000, vol. 73., No. 11, 529-534 (6 pages).

* cited by examiner

FLUOROPOLYETHER GROUP-CONTAINING COMPOUND

CROSS REFERENCE TO RELATED APPLICATIONS

This application is a Rule 53(b) Continuation of International Application No. PCT/JP2020/034137 filed Sep. 9, 2020, claiming priority based on Japanese Patent Application No. 2019-176063 filed Sep. 26, 2019, the disclosures of which are incorporated herein by reference in their entireties.

TECHNICAL FIELD

The present disclosure relates to a fluoropolyether group-containing compound.

BACKGROUND ART

Compounds having a fluoropolyether group are used in various applications. For example, a compound having a fluoropolyether group in the molecular backbone and a hydrolyzable group bonded to a Si atom is used as a compound used for surface treatment of a base material (for example, Patent Document 1 and the like).

The compound described in Patent Document 1 is usually formed by introducing a functional group (in Patent Document 1, a hydrolyzable group bonding to a Si atom) into an intermediate having a fluoropolyether group. That is, it is necessary for the intermediate as described above to have a site into which another functional group can be introduced.

For example, Patent Document 2 describes fluoropolyether group-containing compounds. The compounds described in Patent Document 2 have —$CH_2OH$, —$CH_2NH_2$, or —CHO present at the ends. Specifically, in Example 1 of Patent Document 2, a compound having a —$CH_2NH_2$ group at the end is formed, and in Example 9, a compound having a —CHO group at the end is formed. Other functional group can be introduced into the site which comprises the aldehyde group or the like present at the end of the compound in Patent Document 2.

CITATION LIST

Patent Document

Patent Document 1: JP 2014-218639 A
Patent Document 2: JP 2004-68007 A

SUMMARY OF THE INVENTION

The present disclosure provides [1] below.
[1] A fluoropolyether group-containing compound of formula (1a) or formula (1b):

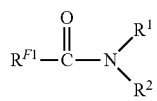

(1a)

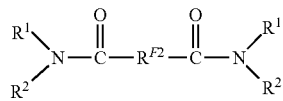

(1b)

wherein
$R^{F1}$ is each independently at each occurrence $Rf^1$—$R^F$—$O_q$—;
$R^{F2}$ is —$Rf^2_p$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1; and
$R^1$ and $R^2$, each independently at each occurrence, are an alkyl group or an alkoxy group having 1 to 10 carbon atoms, or together form a group having a ring structure which is a 5 to 10-membered heterocyclic ring, or together form a group having a ring structure which is a condensed ring containing a 5 to 10-membered heterocyclic ring, wherein the alkyl group, the alkoxy group and the group having the ring structure may be substituted.

Advantageous Effect

According to the present disclosure, it is possible to provide a novel fluoropolyether group-containing compound. By using the compound of the present disclosure as a reaction raw material, it is possible to provide a compound having an aldehyde group at an end, wherein the aldehyde group is a site where other functional group can be easily introduced, under milder conditions, specifically, conditions that do not require heating and refluxing.

DETAILED DESCRIPTION OF THE PREFERRED EMBODIMENTS

The "monovalent organic group", as used herein, means a monovalent group containing a carbon. The monovalent organic group is not limited, and may be a hydrocarbon group or a derivative thereof. A derivative of a hydrocarbon group means a group having one or more of N, O, S, Si, amide, sulfonyl, siloxane, carbonyl, carbonyloxy, and the like at the terminal or in the molecular chain thereof. When "organic group" is used, it means a monovalent organic group.

The "divalent organic group" means a divalent group containing carbon. The divalent organic group is not limited, and examples include a divalent group obtained by further removing one hydrogen atom from an organic group.

The "hydrocarbon group", as used herein, means a group that contains carbon and hydrogen and that is obtained by removing one hydrogen atom from a hydrocarbon. The hydrocarbon group is not limited, and examples include a $C_{1-20}$ hydrocarbon group that is optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may contain one or more ring structures.

The substituent of the "hydrocarbon group", as used herein, is not limited, and examples include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_6$-10 aryl group, and a 5 to 10-membered heteroaryl group each optionally substituted with one or more halogen atoms.

The "hydrolyzable group", as used herein, means a group capable of undergoing a hydrolysis reaction, i.e., means a group that can be removed from the main backbone of a compound by a hydrolysis reaction. Examples of the hydrolyzable group include $-OR^h$, $-OCOR^h$, $-O-N=CR^h_2$, $-NR^h_2$, $-NHR^h$, and halogen (in these formulae, $R^h$ represents a substituted or unsubstituted $C_{1-4}$ alkyl group).

First Embodiment

The present embodiment relates to a fluoropolyether group-containing compound represented by the following formula (1a) or formula (1b).

By using the compound of the present embodiment as a reaction raw material, it is possible to provide a compound having an aldehyde group under milder conditions, specifically, conditions that do not require heating and refluxing. By reacting a compound having an aldehyde group with another compound, it is possible to introduce substituents.

Formula (1a) or formula (1b):

$$R^{F1}-\underset{\underset{O}{\|}}{C}-N\underset{R^2}{\overset{R^1}{\diagdown}} \qquad (1a)$$

$$\underset{R^2}{\overset{R^1}{\diagdown}}N-\underset{\underset{O}{\|}}{C}-R^{F2}-\underset{\underset{O}{\|}}{C}-N\underset{R^2}{\overset{R^1}{\diagdown}} \qquad (1b)$$

In formula (1a), $R^{F1}$ is each independently at each occurrence $Rf^1-R^F-O_q$.

In formula (1b), $R^{F2}$ is $-Rf^2_p-R^F-O_q$.

In the formula, $Rf^1$ is each independently at each occurrence a $C_{1-16}$ alkyl group optionally substituted with one or more fluorine atoms.

The "$C_{1-16}$ alkyl group" in the $C_{1-16}$ alkyl group optionally substituted with one or more fluorine atoms may be linear or branched, and is preferably a linear or branched $C_{1-6}$ alkyl group, particularly $C_{1-3}$ alkyl group, more preferably a linear $C_{1-6}$ alkyl group, particularly $C_{1-3}$ alkyl group.

$Rf^1$ is preferably a $C_{1-16}$ alkyl group substituted with one or more fluorine atoms, more preferably a $CF_2H-C_{1-15}$ perfluoroalkylene group, and even more preferably a $C_{1-16}$ perfluoroalkyl group.

The $C_{1-16}$ perfluoroalkyl group may be linear or branched, and is preferably a linear or branched $C_{1-6}$ perfluoroalkyl group, particularly $C_{1-3}$ perfluoroalkyl group, more preferably a linear $C_{1-6}$ perfluoroalkyl group, particularly $C_{1-3}$ perfluoroalkyl group; specifically, $-CF_3$, $-CF_2CF_3$, or $-CF_2CF_2CF_3$.

In the formula, $Rf^2$ is a $C_{1-6}$ alkylene group optionally substituted with one or more fluorine atoms.

The "$C_{1-6}$ alkylene group" in the $C_{1-6}$ alkylene group optionally substituted with one or more fluorine atoms may be linear or branched, and is preferably a linear or branched $C_{1-3}$ alkylene group, and more preferably a linear $C_{1-3}$ alkylene group.

$Rf^2$ is preferably a $C_{1-6}$ alkylene group substituted with one or more fluorine atoms, more preferably a $C_{1-6}$ perfluoroalkylene group, and even more preferably a $C_{1-3}$ perfluoroalkylene group.

The $C_{1-6}$ perfluoroalkylene group may be linear or branched, and is preferably a linear or branched $C_{1-3}$ perfluoroalkylene group, and more preferably a linear $C_{1-3}$ perfluoroalkylene group; specifically, $-CF_2-$, $-CF_2CF_2-$, or $-CF_2CF_2CF_2-$.

In the formula, p is 0 or 1. In one embodiment, p is 0. In another embodiment, p is 1.

In the formula, q is each independently at each occurrence 0 or 1. In one embodiment, q is 0. In another embodiment, q is 1.

In the formulas (1a) and (1b), $R^F$ is each independently at each occurrence a divalent fluoropolyether group.

$R^F$ is preferably a fluoropolyether group represented by formula:

$$(OC_6F_{12})_a-(OC_5F_{10})_b-(OC_4F_8)_c-(OC_3F_6)_d-(OC_2F_4)_e-(OCF_2)_f-$$

In the formula, a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

a, b, c, d, e and f may preferably each independently be an integer of 0 to 100.

The sum of a, b, c, d, e and f is preferably 5 or more, more preferably 10 or more, and may be, for example, 15 or more and 20 or more. The sum of a, b, c, d, e, and f is preferably 200 or less, more preferably 100 or less, even more preferably 60 or less, and may be, for example, 50 or less or 30 or less.

These repeating units may be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, and is preferably $-(OCF_2CF_2CF_2CF_2)-$. $-(OC_3F_6)-$ may be any of $-(OCF_2CF_2CF_2)-$, $-(OCF(CF_3)CF_2)-$ and $-(OCF_2CF(CF_3))-$, and is preferably $-(OCF_2CF_2CF_2)-$. Also, $-(OC_2F_4)-$ may be any of $-(OCF_2CF_2)-$ and $-(OCF(CF_3))-$, and is preferably $-(OCF_2CF_2)-$.

In one embodiment, $R^F$ is each independently at each occurrence represented by the following formula (f1), (f2), (f3), (f4), or (f5):

$$(OC_3F_6)_d-(OC_2F_4)_e- \qquad (f1)$$

wherein d is an integer of 1 to 200, and e is 1, $$-(OC_4F_8)_c-(OC_3F_6)_d-(OC_2F_4)_e-(OCF_2)_f- \qquad (f2)$$

wherein c and d are each independently an integer of 0 or more and 30 or less, and e and f are each independently an integer of 1 or more and 200 or less;

the sum of c, d, e, and f is 2 or more; and the occurrence order of the respective repeating units enclosed in parentheses provided with the subscription c, d, e or f is not limited in the formula,

$$—(R^6—R^7)_g—\quad\quad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups; and g is an integer of 2 to 100,

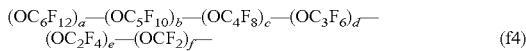
$$(OC_6F_{12})_a—(OC_5F_{10})_b—(OC_4F_8)_c—(OC_3F_6)_d—\\(OC_2F_4)_e—(OCF_2)_f—\quad\quad (f4)$$

wherein e is an integer of 1 or more and 200 or less, a, b, c, d, and f are each independently an integer of 0 or more and 200 or less, the sum of a, b, c, d, e and f is at least 1, and the occurrence order of the respective repeating units enclosed in parentheses provided with a, b, c, d, e or f is not limited in the formula,

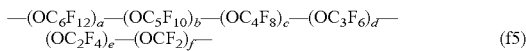
$$—(OC_6F_{12})_a—(OC_5F_{10})_b—(OC_4F_8)_c—(OC_3F_6)_d—\\(OC_2F_4)_e—(OCF_2)_f—\quad\quad (f5)$$

wherein f is an integer of 1 or more and 200 or less, a, b, c, d, and e are each independently an integer of 0 or more and 200 or less, the sum of a, b, c, d, e and f is at least 1, and the occurrence order of the respective repeating units enclosed in parentheses provided with a, b, c, d, e or f is not limited in the formula.

In the formula (f1), d is preferably an integer of 5 to 200, more preferably 10 to 100, and even more preferably 15 to 50, for example, 25 to 35. The formula (f1) is preferably a group represented by —$(OCF_2CF_2CF_2)_d$—$(OC_2F_4)_e$— or —$(OCF(CF_3)CF_2)_d$—$(OC_2F_4)_e$—, and more preferably a group represented by —$(OCF_2CF_2CF_2)_d$—$(OC_2F_4)_e$—.

In the formula (f2), e and f are each independently an integer of preferably 5 or more and 200 or less, and more preferably 10 to 200. Further, the sum of c, d, e, and f is preferably 5 or more, more preferably 10 or more, for example, 15 or more and 20 or less. In one embodiment, the formula (f2) is preferably a group represented by —$(OCF_2CF_2CF_2CF_2)_c$—$(OCF_2CF_2CF_2)_d$—$(OCF_2CF_2)_e$—$(OCF_2)_f$—. In another embodiment, formula (f2) may be a group represented by —$(OC_2F_4)_e$—$(OCF_2)_f$—.

In the formula (f3), $R^6$ is preferably $OC_2F_4$. In the formula (f3), $R^7$ is preferably a group selected from $OC_2F_4$, $OC_3F_6$ and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$ and $OC_4F_8$ include, but are not limited to —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula (f3), g is preferably an integer of 3 or more, and more preferably 5 or more. g is preferably 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably —$(OC_2F_4—OC_3F_6)_g$— or —$(OC_2F_4—OC_4F_8)_g$—.

In the formula (f4), e is preferably an integer of 1 or more and 100 or less, and more preferably 5 or more and 100 or less. The sum of a, b, c, d, e and f is preferably 5 or more, and more preferably 10 or more, for example, 10 or more and 100 or less.

In the formula (f5), f is preferably an integer of 1 or more and 100 or less, and more preferably 5 or more and 100 or less. The sum of a, b, c, d, e and f is preferably 5 or more, and more preferably 10 or more, for example, 10 or more and 100 or less.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

The ratio of e to f in $R^F$ (hereinafter referred to as an "e/f ratio") is 0.1 to 10, preferably 0.2 to 5, more preferably 0.2 to 2, and even more preferably 0.2 to 1.5. In the present embodiment, f is an integer of 1 or more.

For example, when a hydrolyzable group bonded to a Si atom is introduced into the end of the fluoropolyether group-containing compound of the present embodiment to form a final product, the final product can be used as a surface-treating agent for a base material. With the e/f ratio within the above range, the lubricity, friction durability, and chemical resistance (such as durability against (human) sweat) of a surface-treating layer obtained from the final product are further increased. The smaller the e/f ratio is, the higher the lubricity and the friction durability of the surface-treating layer are. On the other hand, with an e/f ratio of 0.1 or more, the stability of the final product can be further increased. The larger the e/f ratio is, the higher the stability of the final product is.

In one embodiment, the e/f ratio is preferably 0.2 to 0.9, more preferably 0.2 to 0.85, and even more preferably 0.2 to 0.8.

In one embodiment, from the viewpoint of heat resistance, the e/f ratio is preferably 0.4 or more, and more preferably 0.4 to 1.5.

In one embodiment, from the viewpoint of heat resistance, the e/f ratio may be, for example, 0.9 to 5.0, may be 0.9 to 2.0, or may be 0.9 to 1.5. The lower limit of the e/f ratio is preferably 1.0 or more, and may be, for example, 1.1 or more, or 1.3 or more.

The number average molecular weight of the $R^{F1}$ and $R^{F2}$ moiety is not limited, and is, for example, 500 to 30,000, preferably 1,500 to 30,000, and more preferably 2,000 to 10,000. Herein, the number average molecular weight of $R^{F1}$ and $R^{F2}$ are values measured by $^{19}$F-NMR.

In another embodiment, the number average molecular weight of $R^{F1}$ and $R^{F2}$ moiety can be 500 to 30,000, preferably 1,000 to 20,000, more preferably 2,000 to 15,000, and even more preferably 2,000 to 10,000, for example, 3,000 to 8,000.

In the compound represented by formula (1a) or (1b) of the present embodiment, a group represented by —C(=O)N is directly bonded to $R^{F1}$ or $R^{F2}$. By having such a structure, the reactivity of the compound of the present embodiment becomes favorable, and a compound having an aldehyde group can be provided under milder conditions by using the compound of the present embodiment as a reaction raw material. By having the above structure, when the compound of the present embodiment is used as a reaction raw material, the reaction can be easily controlled.

$R^1$ and $R^2$, each independently at each occurrence, are an optionally substituted monovalent organic group, or together form a group having an optionally substituted heterocyclic ring structure.

In one embodiment, $R^1$ and $R^2$ are each independently at each occurrence an optionally substituted monovalent organic group.

In one embodiment, $R^1$ and $R^2$ are together form a group having an optionally substituted heterocyclic ring structure.

In $R^1$ and $R^2$, the monovalent organic group is, for example, a monovalent group having 1 to 10 carbon atoms.

Examples of the monovalent organic group in $R^1$ and $R^2$ include an alkyl group, an alkoxy group, a benzotriazole group, a pyrrole group, a morpholino group, a benzyl group, a phenyl group, and a phenoxy groups, and these groups (specifically, hydrogen atom) may be substituted by a substituent. When $R^1$ and $R^2$ are monovalent organic groups, $R^1$ and $R^2$ are preferably unsubstituted monovalent organic groups.

When $R^1$ and $R^2$ are monovalent organic groups, $R^1$ and $R^2$ are each independently at each occurrence preferably an alkyl group or alkoxy group, more preferably a $C_{1-10}$ alkyl group (preferably a $C_{1-4}$ alkyl group such as a methyl group, an ethyl group, a propyl group, an isopropyl group), and a $C_{1-10}$ alkoxy group (preferably a $C_{1-4}$ alkoxy group such as a methoxy group, an ethoxy group, a propoxy group, an isopropoxy group), and even more preferably a methyl group and a methoxy group.

In one embodiment, when $R^1$ and $R^2$ are monovalent organic groups, one of $R^1$ and $R^2$ is an alkyl group and the other is an alkoxy group. Specifically, one of $R^1$ and $R^2$ is a $C_{1-10}$ alkyl group and the other is a $C_{1-10}$ alkoxy group, preferably one is a $C_{1-4}$ alkyl group (in particular a methyl group, an ethyl group, a propyl group, an isopropyl group) and the other is a $C_{1-4}$ alkoxy group (in particular a methoxy group, an ethoxy group, a propoxy group, an isopropoxy group), and more preferably one is a methyl group and the other is a methoxy group.

In the compounds of formulas (1a) and (1b) having the structure of the present embodiment, there are oxygen atoms of the amide group (i.e., the group represented by —C(=O)N) and oxygen atoms present in the vicinity of (for example, adjacent to) the nitrogen atom of the amide group. By having such a structure, control of the reaction using the compound of the present embodiment can be facilitated. It is considered that this is because the reactivity of the compound of the present embodiment can be improved by having such a structure.

In addition, it is considered that when the compound of the present embodiment is used as a reaction raw material and a metal catalyst, specifically, a Grignard reagent or an organolithium compound (for example, alkyllithium) is used together, a metal atom, for example, Mg or Li, and the two oxygen atoms of the compound are coordinated. As a result, control of the reaction can be further facilitated.

Further, the compound having the structure of the present embodiment is advantageous in terms of stability of the compound.

In other words, the heterocyclic ring structure is a ring structure wherein the ring structure is formed with the N atom to which $R^1$ and $R^2$ are bonded, $R^1$, and $R^2$. For example, when $R^1$ and $R^2$ together form the groups of the above-described heterocyclic ring structure, formulas (1a) and (1b) are represented as follows. In the following formulas, "W" is a heterocyclic ring structure which is formed with $R^1$ and $R^2$ together, and the heterocyclic ring structure (specifically, the hydrogen atom) may be substituted. The heterocyclic ring structure may have an unsaturated bond in the ring structure. Examples of the unsaturated bond include a carbon-carbon unsaturated bond, a carbon-nitrogen unsaturated bond, and a nitrogen-nitrogen unsaturated bond.

Note that the following description is not intended to exclude the case where in formula (1b), in the two pairs of $R^1$ and $R^2$, one pair is a ring structure and the other is a monovalent organic group.

(1a)

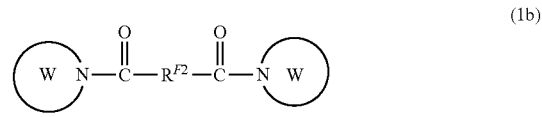

(1b)

W may be a group containing 2 to 10 carbon atoms in the ring structure.

W may be a 5 to 10-membered heterocyclic ring or a condensed ring containing a heteroatom in the ring structure.

In the present embodiment, the heterocyclic ring of the 5 to 10-membered heterocyclic ring means to have a single ring. That is, the heterocyclic ring means that it does not have a condensed ring.

In one embodiment, W may be a group containing 1 to 4 heteroatoms in the ring structure. The 1 to 4 heteroatoms include a N atom directly bonded to a carbonyl group.

Preferably, W is a group having 2 to 10 carbon atoms in the ring structure, and the group has 1 to 4 heteroatoms in the ring structure.

Examples of the heteroatom include N atom, O atom, and S atom, preferably N atom and O atom.

In one embodiment, when W contains a heteroatom in addition to the N atom directly bonded to the carbonyl group, the heteroatom is an O atom or one or more N atoms.

In the examples of the condensed ring, $R^1$ and $R^2$ together form a group having a ring structure, and the ring structure includes a 5 to 10-membered heterocyclic ring as a condensed ring, preferably a 5 to 7-membered heterocyclic ring as a condensed ring. The heterocyclic structure may have an unsaturated bond in the ring structure.

The condensed ring may be formed by bonding two or more ring structures by sharing two or more atoms, and specifically, may be formed by bonding the 5 to 10-membered heterocyclic ring and a ring structure other than the heterocyclic ring by sharing two adjacent atoms. Examples of the ring structure other than the heterocyclic ring include a 5 to 10-membered ring structure, preferably a 5 to 7-membered ring structure, and more preferably a 5 or 6-membered ring structure, in particular a benzene ring, and a nitrogen-containing six membered ring, and preferably a benzene ring. Examples of the nitrogen-containing six membered ring include the following structures. In the following description, the atom denoted by "#" is an atom shared with a 5 to 10-membered heterocyclic ring.

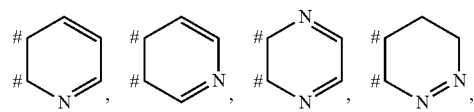

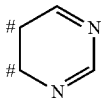

In one embodiment, when $R^1$ and $R^2$ together form a group having a ring structure, examples of the ring structure include a 5 to 10-membered heterocyclic ring (preferably a 5 to 7-membered heterocyclic ring) or a condensed ring containing a heteroatom in the ring structure. The condensed ring preferably contains a 5 to 10-membered heterocyclic ring (preferably a 5 to 7-membered heterocyclic ring), and more preferably has a ring structure in which the 5 to 10-membered heterocyclic ring is condensed with a benzene ring or a nitrogen-containing six membered ring. The heterocyclic structure may have an unsaturated bond in the ring structure.

Examples of the 5 to 10-membered heterocyclic ring include the following structures. In the following structures, "*" represents a bond and is bonded to the C=O group of formula (1a) or (1b).

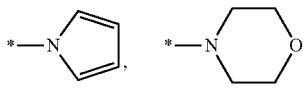

Examples of the condensed ring include the following structures. In the following structures, "*" represents a bond and is bonded to the C=O group of formula (1a) or (1b).

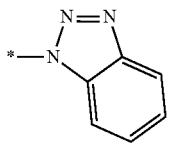 [SMILES: *n1nnc2ccccc21]

In a preferable embodiment, $R^1$ and $R^2$ are each independently at least one selected from a $C_{1-10}$ alkoxy group or a $C_{1-10}$ alkyl group, or $R^1$ and $R^2$, together with a nitrogen atom to which $R^1$ and $R^2$ are bonded, form a group of the following structural formula:

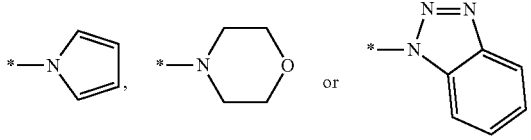

wherein * is a bond.

In another preferable embodiment, wherein one of $R^1$ and $R^2$ is a methyl group and the other is a methoxy group, or $R^1$ and $R^2$, together with a nitrogen atom to which $R^1$ and $R^2$ are bonded, form a group of the following structural formula:

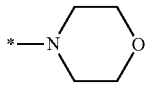

wherein * is a bond.

In one embodiment, the compound represented by formula (1b) has two pairs of $R^1$ and $R^2$, both of which are monovalent organic groups.

In one embodiment, the compound represented by formula (1b) has two pairs of $R^1$ and $R^2$, and $R^1$ and $R^2$ together form a ring structure, respectively.

In one embodiment, the compound represented by formula (1b) has two pairs of $R^1$ and $R^2$, one pair of $R^1$ and $R^2$ are monovalent organic groups, and the other pair of $R^1$ and $R^2$ together form a ring structure.

In one embodiment, the fluoropolyether group-containing compound of the present embodiment is represented by formula (1a).

In one embodiment, the fluoropolyether group-containing compound of the present embodiment is represented by formula (1b).

In one embodiment, the compound represented by formula (1a) may be contained in an amount of 0 to 40 parts by mass, based on total 100 parts by mass of the compound represented by formula (1a) and the compound represented by formula (1b).

The fluoropolyether group-containing compound represented by formula (1a) or (1b) can be produced by combining known methods. An example of a method of the present embodiment suitable for the synthesis of the compound represented by formula (1a) or (1b) is described below as one embodiment.

The method for producing a compound represented by formula (1a) or (1b) of the present embodiment includes a step (1) of reacting a carboxylic group of the following formula (1a') or (1b'):

 (1a')

 (1b')

with an amine compound to synthesize a compound represented by formula (1a) or (1b):

 (1a)

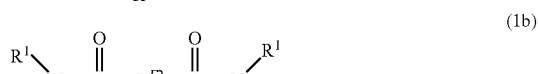 (1b)

$R^{F1}$ and $R^{F2}$ in formulas (1a') and (1b') are the same as $R^{F1}$ and $R^{F2}$ in formulas (1a) and (1b), respectively.

The amine compound in step (1) is a compound capable of reacting with formula (1a') or (1b') to form a group represented by —$NR^1R^2$ in formula (1a) or (1b). $R^1$ and $R^2$ have the same meanings as in formulas (1a) and (1b).

More specific examples of the amine compound include N,O-dimethylhydroxylamine, pyrrole, morpholine, and benzotriazole, and salts thereof (for example, hydrochloride, sulfate, carbonate, silver salt, and various carboxylates).

Step (1) may be performed in a suitable solvent in the presence of a suitable catalyst. Examples of suitable solvent include, but are not limited to, various organic solvents such as hydrofluorocarbon, hydrochlorofluorocarbon (for example, AK-225: manufactured by AGC Inc.), chloroform, dichloromethane, acetonitrile, tetrahydrofuran (THF), dimethyl sulfoxide (DMSO), and N,N-dimethylformamide (DMF). These solvents may be used alone or in combination of two or more thereof, and are preferably used in combination of two or more thereof. When two or more solvents are used in combination, it is preferable to use, for example, at least one of highly polar solvents such as DMSO and DMF, and at least one of solvents other than the highly polar solvents such as AK-225, HFE 7200, and HFE 7300, which have appropriate solubility of organic compounds.

Examples of suitable catalysts include, but are not limited to, amine bases such as pyridine, collidine, N,N-dimethyl-4-aminopyridine (DMAP), triethylamine, and Hunig's base.

The reaction in step (1) is not limited, but may be performed, for example, at −78 to 200° C. The reaction time in step (1) is not limited, but may be, for example, 0.1 to 168 hours. The reaction pressure in step (1) is not limited, but is, for example, 0 to 100 MPa (gauge pressure), and is conveniently ambient pressure.

In step (1), a compound such as a halogenating agent such as thionyl chloride, phosphorus trichloride, phosphorus pentachloride, sulfuryl chloride, and oxalyl chloride; a dehydrating agent such as toluene sulfonic acid, trifluoromethanesulfonic acid, trifluoroacetic anhydride, trifluoromethanesulfonic acid, methanesulfonic acid, or a salt thereof (for example, a halogenated salt, preferably tosyl chloride, trifluoromethane sulfonic acid chloride, mesyl chloride or the like); and a condensing agent such as 1-[bis(dimethylamino)methylene]-1H-1,2,3-triazolo[4,5-b]pyridinium 3-oxide hexafluorophosphate (HATU), 1,1'-carbonyldiimidazole (CDI), N,N'-dicyclohexylcarbodiimide (DCC), BOP reagents such as benzotriazol-1-yloxy-trisdimethylamino phosphonium salts, 1-(3-dimethylaminopropyl)-3-ethylcarbodiimide hydrochloride (EDCI), and (1-cyano-2-ethoxy-2-oxoethylideneaminooxy)dimethyl aminomorpholinocarbenium hexafluorophosphate (COMU) can be further used.

The step (1) may be, for example, the following reaction.

From a compound represented by the following formula (1a') or (1b'):

(1a')

(1b')

a compound represented by the following formula (1a") or (1b")

(1a")

(1b")

is formed (step 1-1), and from the compound represented by the formula (1a") or (1b"), a compound represented by the following formula (1a) or (1b):

(1a)

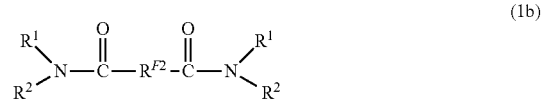

(1b)

is synthesized (step 1-2).

In formulas (1a") and (1b"), $Z^1$ each independently at each occurrence represents a halogen atom or an alkoxide group, preferably —F, —Cl, —Br, or —I, more preferably —Cl.

$R^{F1}$ and $R^{F2}$ in formulas (1a") and (1b") are the same as $R^{F1}$ and $R^{F2}$ in formulas (1a) and (1b), respectively.

Step (1-1) may be performed in a suitable solvent in the presence of a suitable catalyst. Examples of suitable solvents include, but are not limited to, fluorinated solvents such as m-xylene hexafluoride (mXHF), AK 225, HFE 7200, HFE 7300, and perfluorohexane. These solvents may be used alone or in combination of two or more.

Examples of suitable catalysts include, but are not limited to, N,N-dimethylformamide and DMAP.

The reaction in step (1-1) is not limited, but may be performed, for example, at −78 to 200° C. The reaction time in step (1-1) is not limited, but may be, for example, 0.1 to 168 hours. The reaction pressure in step (1-1) is not limited, but is, for example, 0 to 100 MPa (gauge pressure), and is conveniently ambient pressure.

In step (1-1), as the compound to be reacted with the end carboxylic acid of formula (1a') or (1b'), for example, a halogenating agent such as thionyl chloride, phosphorus trichloride, phosphorus pentachloride, sulfuryl chloride or oxalyl chloride can be used.

Step (1-2) may be performed in a suitable solvent in the presence of a suitable catalyst. Examples of suitable solvent include, but are not limited to, various organic solvents such as hydrochlorofluorocarbon (for example, AK-225: manufactured by AGC Inc.), chloroform, dichloromethane, acetonitrile, tetrahydrofuran (THF), dimethyl sulfoxide (DMSO), and N,N-dimethylformamide (DMF). These solvents may be used alone or in combination of two or more.

Examples of suitable catalysts include, but are not limited to, amine bases such as pyridine, collidine, N,N-dimethyl-4-aminopyridine (DMAP), triethylamine, and Hunig's base.

The reaction in step (1-2) is not limited, but may be performed, for example, at −78 to 200° C. The reaction time in step (1-2) is not limited, but may be, for example, 0.1 to 168 hours. The reaction pressure in step (1-2) is not limited, but is, for example, 0 to 100 MPa (gauge pressure), and is conveniently ambient pressure.

The aldehyde group-containing compound can be formed from the compound represented by formula (1a) or formula (1b) of the present embodiment under relatively mild conditions, in particular, without the need for heating and refluxing. Furthermore, a compound having another functional group (for example, a ketone group, an alkyne group, and a vinyl group) may be formed from the compound represented by formula (1a) or formula (1b) of the present embodiment. By using the compound represented by formula (1a) or formula (1b), a compound having another functional group as described above can be formed under a mild condition, for example, an environment of 0° C. to room temperature.

It is considered that the compound of the present embodiment has a group of -c(=O)N, the reactivity of the compound may be improved, and when the compound of the present embodiment is used as a reaction raw material, the reaction can be easily controlled.

Hereinafter, fluoropolyether group-containing compounds will be described as second to fifth embodiments, and these fluoropolyether group-containing compounds are compounds that can be formed using the compound represented by formula (1a) or (1b) of the first embodiment as an intermediate.

Second Embodiment

The present embodiment relates to a fluoropolyether group-containing compound represented by the following formula (2a) or (2b).

According to this embodiment, it is possible to provide a novel fluoropolyether group-containing compound having a plurality of carbon-carbon unsaturated bonds in the molecular structure. It enables for the compound of the present embodiment to form a compound having a various kinds of functional group. Therefore, the compound of formula (2a) or (2b) is useful as an intermediate in a synthetic reaction.

Formula (2a) or (2b):

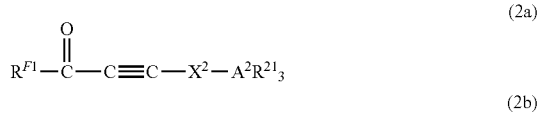

$R^{F1}$ and $R^{F2}$ have the same meaning as $R^{F1}$ and $R^{F2}$ of the first embodiment, respectively.

$X^2$ is a divalent organic group.

Preferably, $X^2$ is a $C_{1-3}$ alkylene group. In $X^2$, the alkylene group may be linear or branched.

In $X^2$, the $C_{1-3}$ alkylene group may be —CH$_2$—, —CH$_2$CH$_2$—, —CH$_2$CH$_2$CH$_2$—, —CH(CH$_3$)—, —CH(CH$_3$) CH$_2$—, and —CH$_2$CH(CH$_3$)—, and preferably —CH$_2$—.

In one embodiment, $X^2$ is optionally and each independently substituted with one or more substituents selected from a fluorine atom, a $C_{1-3}$ alkyl group and a $C_{1-3}$ fluoroalkyl group (preferably a $C_{1-3}$ perfluoroalkyl group).

The right side of the structure denoted as $X^2$ binds to the $A^2$.

$A^2$ is each independently at each occurrence C or Si.

In one embodiment, $A^2$ is a C atom.

In one embodiment, $A^2$ is a Si atom.

$R^{21}$ is each independently a hydrocarbon group having at least one carbon-carbon unsaturated bond. The carbon-carbon unsaturated bond is, i.e., a carbon-carbon double bond or a carbon-carbon triple bond.

$R^{21}$ is, for example, a group represented by —Y$^{21}$—CH=CH—Y$^{22}$, —Y$^{21}$—CC—Y$^{22}$ (wherein —CC— represents a carbon-carbon triple bond), and preferably a group represented by —Y$^{21}$—CH=CH—Y$^{22}$.

$Y^{21}$ is a divalent organic group.

Preferably, $Y^{21}$ is a $C_{1-3}$ alkylene group. In $Y^{21}$, the alkylene group may be linear or branched.

In $Y^{21}$, the $C_{1-3}$ alkylene group may be, for example, —CH$_2$—, —CH$_2$CH$_2$—, —CH$_2$CH$_2$CH$_2$—, —CH(CH$_3$)—, —CH(CH$_3$) CH$_2$—, and —CH$_2$CH(CH$_3$)—, and preferably —CH$_2$—.

$Y^{22}$ is a hydrogen atom or a monovalent organic group, preferably a hydrogen atom.

In one embodiment, the fluoropolyether group-containing compound of the present embodiment is represented by formula (2a).

In one embodiment, the fluoropolyether group-containing compound of the present embodiment is represented by formula (2b).

The compound represented by formula (2a) or (2b) of the present embodiment has a plurality of carbon-carbon unsaturated bonds in the molecular chain as described above.

By having such a structure, the compound represented by formula (2a) or (2b) can be usefully used as an intermediate in a synthetic reaction. Specifically, it is possible to form a compound having a various kind of functional group from the compound of the present embodiment, because another functional group can be introduced into the carbon-carbon unsaturated bond of the compound of the present embodiment.

In one embodiment, it is possible to introduce a group having a Si atom bonded to a hydrolysable group into a carbon-carbon unsaturated bond, in particular into the carbon-carbon unsaturated bond of $R^{21}$ of the compound of formula (2a) or (2b). Such a compound having a group containing a Si atom can be usefully used as a surface-treating agent which can be used for surface treatment of a base material, for example.

Examples of methods for synthesizing the compound represented by formula (2a) or (2b) include, but are not limited to, the following methods.

Examples of a method for synthesizing a compound represented by formula (2a) or (2b) include a method including a step (2-1) of adding, to a fluoropolyether group-containing compound represented by formula (1a) or (1b):

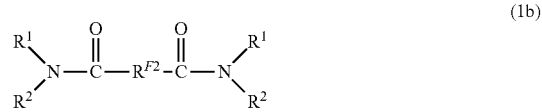

a compound represented by the following formula (2c):

together with an organic lithium to obtain a fluoropolyether group-containing compound represented by formula (2a) or formula (2b):

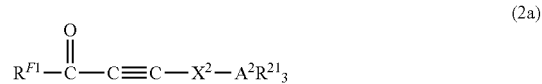

-continued

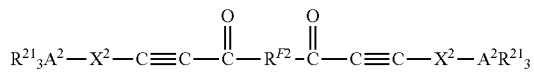
(2b)

Step (2-1) is performed by using an organic lithium. Examples of the organic lithium include alkyllithium. Examples of the alkyllithium include, but are not limited to, n-butyllithium, sec-butyllithium, and tert-butyllithium.

In the present embodiment, the organic lithium and the compound represented by formula (2c) are used as described above, and a compound in which lithium is introduced into the end on the carbon-carbon triple bond side of the compound represented by formula (2c) is formed. The compound in which lithium is introduced is a compound having high nucleophilicity, and the compound represented by formula (2a) or (2b) can easily be synthesized by reacting the compound in which lithium is introduced with the compound having an amide group represented by formula (1a) or (1b).

The mixing ratio of the compound represented by formula (2c) and the organic lithium can be a ratio that can be usually used, and can be used, but not limited to, for example, in a molar ratio of 1:1 to 1:2.

Step (2-1) may be performed in a suitable solvent. Examples of suitable solvents include tetrahydrofuran, diethyl ether, HFE 7200, and HFE 7300. One of these solvents may be used singly, or two or more thereof may be used in combination.

Step (2-1) is not limited, but can be performed, for example, at −78 to 200° C. The reaction time of step (2-1) is not limited, but may be, for example, 0.1 to 168 hours. The reaction pressure in step (2-1) is not limited, but is, for example, 0 to 100 MPa (gauge pressure), and is conveniently ambient pressure.

As described above, by using the compounds of formulas (1a) and (1b), a group having a plurality of carbon-carbon unsaturated bonds can be easily introduced into the fluoropolyether group-containing compound. According to the present method, a group having a carbon-carbon unsaturated bond can be introduced under mild conditions, in particular without heating.

In formulas (2a) and (2b), $R^{F1}$ and $R^{F2}$ have the same meaning as $R^{F1}$ and $R^{F2}$ of the first embodiment, respectively.

$X^2$, $A^2$, and $R^{21}$ in formulas (2a) and (2b) correspond $X^2$, $A^2$, and $R^{21}$ of formula (2c), respectively.

The compound represented by formula (2c) can be synthesized from, for example, a compound represented by the following formula (2d). That is, the method may further include the following step (2-2) of synthesizing a compound represented by formula (2c).

Step (2-2) of reacting a compound represented by formula (2d):

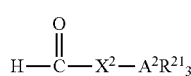
(2d)

with Ohira-Bestmann reagent to synthesize a compound represented by formula (2c):

H—C≡C—$X^2$-$A^2R^{21}_3$ (2c)

The Ohira-Bestmann reagent in step (2-2) is dimethyl (1-diazo-2-oxopropyl)phosphonate.

Step (2-2) may be performed in a suitable solvent in the presence of a suitable catalyst. Examples of suitable solvents include, but are not limited to, various organic solvents such as methanol, THF, and dioxane. These solvents may be used alone or in combination of two or more.

Examples of suitable catalysts include, but are not limited to, strong bases such as potassium carbonate, sodium carbonate, potassium tert-butoxide (t-BuOK), and butyllithium (BuLi), and amine bases such as diazabicycloundecene, diazabicyclononene (DBN), triethylamine, and Hunig's base.

In the fluoropolyether group-containing compound represented by formula (2a) or (2b), for example, when $R^{21}$ is represented by —$Y^{21}$—CH=CH—$Y^{22}$ and $Y^{22}$ is a hydrogen atom, the fluoropolyether group-containing compound represented by formula (2a) or (2b) can be hydrosilylated to form a compound having a $SiR^{hx}$ ($R^{hx}$ is a hydrolyzable group) at the molecular end. Such a compound can be usefully used as a surface-treating agent which can be used for surface treatment of a base material, for example.

In another embodiment, the fluoropolyether group-containing compound represented by formula (2a) or (2b) can undergo a cyclization reaction to form a compound represented by formula (2e) or (2f), for example.

Specifically, the carbonyl group C=O of formula (2a) or (2b) can be reacted with hydroxylamine hydrochloride or the like to form a group represented by C=N—OH, followed by a condensation reaction to form a compound represented by formula (2e) or (2f).

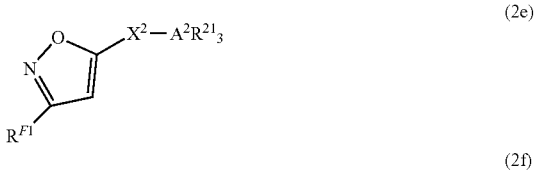
(2e)

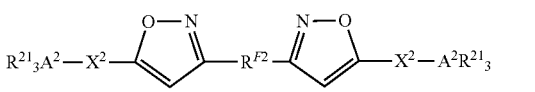
(2f)

In the fluoropolyether group-containing compound represented by the formula (2e) or (2f), for example, when $R^{21}$ is represented by —$Y^{21}$—CH=CH—$Y^{22}$ and $Y^{22}$ is a hydrogen atom, compound having a $SiR^{hx}$ ($R^{hx}$ is a hydrolyzable group) at the molecular end can be formed by hydrosilylation. Such a compound can be usefully used as a surface-treating agent which can be used for surface treatment of a base material, for example.

Third Embodiment

The present embodiment relates to a fluoropolyether group-containing compound represented by the following formula (4a) or (4b).

According to the present embodiment, it is possible to provide a fluoropolyether group-containing compound having an aldehyde end in the molecular structure. It is possible to form a compound having a various kinds of functional group from the compound of the present embodiment.

Formula (4a) or (4b):

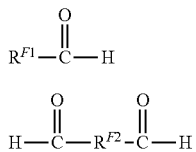
(4a)

(4b)

In the formulas, $R^{F1}$ and $R^{F2}$ have the same meaning as $R^{F1}$ and $R^{F2}$ of the first embodiment, respectively.

The compound represented by formula (4a) or (4b) of the present embodiment has an aldehyde group as described above. By having an aldehyde group, it enables to form a compound having a various kind of functional group from the compound of the present embodiment. Therefore, by having such a structure, the compound represented by formula (4a) or (4b) is useful as an intermediate in a synthetic reaction.

In one embodiment, the fluoropolyether group-containing compound of the present embodiment is represented by formula (4a).

In one embodiment, the fluoropolyether group-containing compound of the present embodiment is represented by formula (4b).

In one embodiment, the compound represented by formula (4a) or (4b) may be, for example, a precursor of the compound represented by formula (3a) or (3b) of the fourth embodiment.

In one embodiment, the compound represented by formula (4a) or (4b) may be a precursor of a compound of the following formula (4c) or (4d). $R^{F1}$ and $R^{F2}$ in formulas (4c) and (4d) are the same as $R^{F1}$ and $R^{F2}$ in formulas (4a) and (4b), respectively.

$$R^{F1}-CH=CH_2 \qquad (4c)$$

$$CH_2=CH-R^{F2}-CH=CH_2 \qquad (4d)$$

Examples of methods for synthesizing the compound represented by formula (4a) or (4b) include, but are not limited to, the following methods.

Specifically, the compound represented by formula (4a) or formula (4b) can be synthesized by a method including a step of reducing the compound represented by formula (1a) or (1b) of the first embodiment:

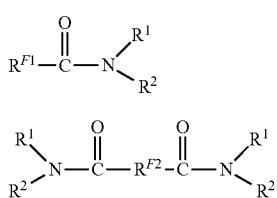
(1a)

(1b)

in the presence of a catalyst to obtain a fluoropolyether group-containing compound represented by formula (4a) or formula (4b):

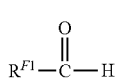
(4a)

-continued

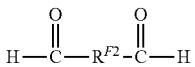
(4b)

In formulas (4a) and (4b), $R^{F1}$ and $R^{F2}$ have the same meaning as $R^{F1}$ and $R^{F2}$ of the first embodiment, respectively.

The above step may be performed in a suitable solvent in the presence of a suitable catalyst. Examples of suitable catalysts include, but are not limited to, diisobutylaluminum hydride and lithium aluminum hydride (LAH). Examples of suitable solvents include, but are not limited to, fluorinated solvents such as HFE 7200 and HFE 7300; non-fluorinated solvents such as THF and diethyl ether; or mixed solvents containing two or more of these. It is preferable to use two or more kinds of the above solvents in combination.

The step is not limited, but may be performed, for example, at −78 to 200° C. The reaction time in the step is not limited, but may be, for example, 0.1 to 168 hours. The reaction pressure in the step is not limited, but is, for example, 0 to 100 MPa (gauge pressure), and is conveniently ambient pressure.

As described above, by using the compounds represented by formulas (1a) and (1b), an aldehyde group can be easily introduced into the fluoropolyether group-containing compound. According to the present method, an aldehyde group can be introduced under mild conditions, in particular without heating.

Fourth Embodiment

The present embodiment relates to a fluoropolyether group-containing compound represented by the following formula (3a) or (3b).

According to the present embodiment, it is possible to provide a novel fluoropolyether group-containing compound having a carbon-carbon triple bond in the molecular end. It enables to form a compound having a various kind of functional group from the compound of the present embodiment.

Formula (3a) or (3b):

(3a)

(3b)

In the formulas, $R^{F1}$ and $R^{F2}$ have the same meaning as $R^{F1}$ and $R^{F2}$ of the first embodiment, respectively.

The compound represented by formula (3a) or (3b) of the present embodiment has an alkyne at an end portion of the compound as described above. By having such a structure, it enables to form a compound having a various kind of functional group from the compound represented by formula (3a) or (3b). The compound represented by formula (3a) or (3b) can be useful as an intermediate in a synthetic reaction.

In one embodiment, the fluoropolyether group-containing compound of the present embodiment is represented by formula (3a).

In one embodiment, the fluoropolyether group-containing compound of the present embodiment is represented by formula (3b).

In one embodiment, the compound represented by formula (3a) or (3b) may be a precursor of a compound represented by the following formula (3c) or (3d). Specifically, the compound represented by the following formula (3c) or (3d) can be synthesized by reacting the compound represented by formula (3a) or (3b) with a compound represented by $N_3X^2A^2R^{21}_3$.

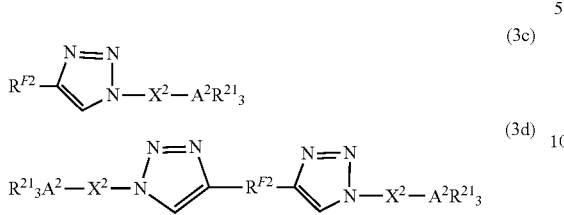

$R^{F1}$ and $R^{F2}$ in formulas (3c) and (3d) are the same as $R^{F1}$ and $R^{F2}$ in formulas (3a) and (3b). $X^2$, $A^2$, and $R^{21}$ in formulas (3c) and (3d) have the same meaning as $X^2$, $A^2$, and $R^{21}$ in formulas (2a) and (2b).

Furthermore, in the compound represented by formula (3c) or (3d), for example, when $R^{21}$ is represented by $-Y^{21}-CH=CH-Y^{22}$ and $Y^{22}$ is a hydrogen atom, the fluoropolyether group-containing compound represented by formula (3c) or (3d) can be hydrosilylated to form a compound having a $SiR^{hx}$ ($R^{hx}$ is a hydrolyzable group) at the molecular end. Such a compound can be used as a surface-treating agent which can be used for surface treatment of a base material, for example.

Examples of methods for synthesizing the compound represented by formula (3a) or (3b) of the present embodiment include, but are not limited to, the following methods.

Specifically, the compound represented by formula (3a) or formula (3b) can be synthesized by a method including a step of reacting a compound represented by formula (4a) or (4b):

with Ohira-Bestmann reagent to obtain a fluoropolyether group-containing compound represented by formula (3c) or formula (3b):

$R^{F1}$ and $R^{F2}$ in formulas (3a) and (3b) are the same as $R^{F1}$ and $R^{F2}$ in formulas (4a) and (4b), respectively.

The step may be performed in a suitable solvent. Examples of suitable solvents include, but are not limited to, fluorinated solvents such as HFE 7200 and HFE 7300; non-fluorinated solvents such as THF and diethyl ether; and mixed solvents containing two or more of these.

The step is not limited, but may be performed, for example, at −78 to 200° C. The reaction time in the step is not limited, but may be, for example, 0.1 to 168 hours. The reaction pressure in the step is not limited, but is, for example, 0 to 100 MPa (gauge pressure), and is conveniently ambient pressure.

As described above, by using the compounds represented by formulas (1a) and (1b), a carbon-carbon triple bond can be easily introduced into the end of the fluoropolyether group-containing compound. According to the present method, a carbon-carbon triple bond can be introduced under mild conditions, in particular without heating.

Fifth Embodiment

The present embodiment relates to a fluoropolyether group-containing compound represented by the following formula (5a) or (5b).

According to the present embodiment, it is possible to provide a fluoropolyether group-containing compound having a carbon-carbon double bond in the molecular structure. It enables to form a compound having a various kind of functional group from the compound of the present embodiment.

Formula (5a) or (5b):

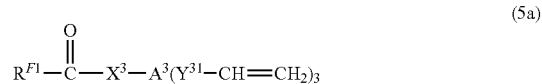

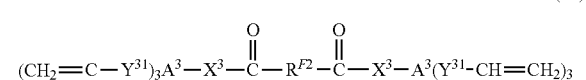

In the formulas, $R^{F1}$ and $R^{F2}$ have the same meaning as $R^{F1}$ and $R^{F2}$ of the first embodiment, respectively.

In the formula, $X^3$ is a divalent organic group.

Preferably, $X^3$ is a $C_{1-3}$ alkylene group. In $X^3$, the $C_{1-3}$ alkylene group may be linear or branched.

In $X^3$, the $C_{1-3}$ alkylene group may be $-CH_2-$, $-CH_2CH_2-$, $-CH_2CH_2CH_2-$, $-CH(CH_3)-$, $-CH(CH_3)CH_2-$, and $-CH_2CH(CH_3)-$, and preferably $-CH_2CH_2-$.

In one embodiment, $X^3$ is optionally and each independently substituted with one or more substituents selected from a fluorine atom, a $C_{1-3}$ alkyl group and a $C_{1-3}$ fluoroalkyl group (preferably, a $C_{1-3}$ perfluoroalkyl group).

The right side of the structure denoted as $X^3$ binds to the $A^3$.

$A^3$ is each independently at each occurrence C or Si.

In one embodiment, $A^3$ is a C atom.

In one embodiment, $A^3$ is a Si atom.

$Y^{31}$ is a divalent organic group.

Preferably, $Y^{31}$ is a $C_{1-3}$ alkylene group. In $Y^{31}$, the alkylene group may be linear or branched.

In $Y^{31}$, the $C_{1-3}$ alkylene group may be $-CH_2-$, $-CH_2CH_2-$, $-CH_2CH_2CH_2-$, $-CH(CH_3)-$, $-CH(CH_3)CH_2-$, and $-CH_2CH(CH_3)-$, and preferably $-CH_2-$.

The left side of the structure denoted as $Y^{31}$ binds to the $A^3$.

In one embodiment, the fluoropolyether group-containing compound of the present embodiment is represented by formula (5a).

In one embodiment, the fluoropolyether group-containing compound of the present embodiment is represented by formula (5b).

The compound represented by formula (5a) or (5b) of the present embodiment has a carbon-carbon double bond at the molecular end as described above.

By having such a structure, the compound represented by formula (5a) or (5b) can be usefully used as an intermediate in a synthetic reaction. Specifically, it is possible to form a compound having a various kind of functional group from the compound of the present embodiment, because another functional group can be introduced into the carbon-carbon double bond of the compound of the present embodiment.

In one embodiment, the compound represented by formula (5a) or (5b) may incorporate a group comprising a Si atom bonded to a hydrolysable group into a carbon-carbon double bond. Such a compound having a group containing a Si atom can be usefully used as a surface-treating agent which can be used for surface treatment of a base material, for example.

Examples of methods for synthesizing the compound represented by formula (5a) or (5b) include, but are not limited to, the following methods.

Examples of a method for synthesizing a compound represented by formula (5a) or (5b) include a method including a step (5-1) of reacting a fluoropolyether group-containing compound represented by formula (1a) or (1b):

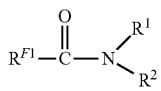
(1a)

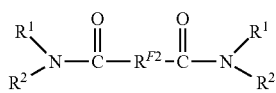
(1b)

with a compound represented by the following formula (5c):

Hal Mg—$X^3$-$A^3$($Y^{31}$—CH=$CH_2$)$_3$ (5c)

Step (5-1) may be performed in a suitable solvent. Examples of suitable solvents include tetrahydrofuran, diethyl ether, HFE 7200, and HFE 7300. One of these solvents may be used singly, or a plurality kinds thereof may be used in combination.

Step (5-1) is not limited, but can be performed, for example, at −78 to 200° C. The reaction time of step (5-1) is not limited, but may be, for example, 0.1 to 168 hours. The reaction pressure in step (5-1) is not limited, but is, for example, 0 to 100 MPa (gauge pressure), and is conveniently ambient pressure.

As described above, by using the compounds represented by formulas (1a) and (1b), a carbon-carbon double bond can be easily introduced into the end of the fluoropolyether group-containing compound. According to the present method, a carbon-carbon double bond can be introduced under mild conditions, in particular without heating.

In formula (5c), $X^3$, $A^3$, and $Y^{31}$ are the same as $X^3$, $A^3$, and $Y^{31}$ in formulas (5a) and (5b), respectively.

In formula (5c), Hal represents a halogen atom. The halogen atoms are, i.e., F, Cl, Br, and I, preferably Br.

Embodiments have been described above, but it will be understood that various modifications can be made to embodiments and details without departing from the spirit and the scope of the claims.

The present disclosure provides [1] to [14] below. [1] A fluoropolyether group-containing compound of formula (1a) or formula (1b):

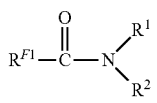
(1a)

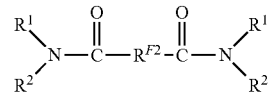
(1b)

wherein
$R^{F1}$ is each independently at each occurrence $Rf^1$—$R^F$—$O_q$—;
$R^{F2}$ is —$Rf^2_p$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1; and
$R^1$ and $R^2$, each independently at each occurrence, are an optionally substituted monovalent organic group, or together form a group having an optionally substituted heterocyclic ring structure.

[2] The fluoropolyether group-containing compound according to [1], wherein $R^F$ is each independently at each occurrence a group represented by formula:

—$(OC_6F_{12})_a$—$(OC_5F_{10})_b$—$(OC_4F_8)_c$—$(OC_3F_6)_d$—$(OC_2F_4)_e$—$(OCF_2)_f$— wherein
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

[3] The fluoropolyether group-containing compound according to [1] or [2], wherein $R^1$ and $R^2$, each independently at each occurrence, are an optionally substituted or unsubstituted monovalent organic group having 1 to 10 carbon atoms, or together form a group having a heterocyclic ring structure, wherein the ring structure contains 2 to 10 carbon atoms.

[4] The fluoropolyether group-containing compound according to any one of [1] to [3], wherein $R^1$ and $R^2$, each independently at each occurrence, are an alkyl group or an alkoxy group having 1 to 10 carbon atoms, or together form a group having a ring structure which is a 5 to 10-membered heterocyclic ring, or together form a group having a ring structure which is a condensed ring containing a 5 to 10-membered heterocyclic ring, wherein the alkyl group, the alkoxy group and the group having the ring structure may be substituted.

[5] The fluoropolyether group-containing compound according to any one of [1] to [4], wherein $R^1$ and $R^2$, each independently at each occurrence, are a $C_{1-10}$ alkyl group or a $C_{1-10}$ alkoxy group, together form a group having a ring structure, wherein the ring structure is a 5 to 10-membered heterocyclic ring, or together form a group having a condensed ring, wherein the condensed ring contains a 5 to 10-membered heterocyclic ring and a 3 to 10-membered ring other than the heterocyclic ring.

[6] The fluoropolyether group-containing compound according to any one of [1] to [5], wherein
$R^1$ and $R^2$, each independently, are a $C_{1-10}$ alkoxy group or a $C_{1-10}$ alkyl group, or $R^1$ and $R^2$, together with a nitrogen atom to which they are bonded, form a group of the following formula:

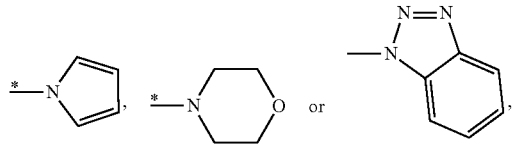

wherein * is a bond.

[7] The fluoropolyether group-containing compound according to any one of [1] to [6], wherein
one of $R^1$ and $R^2$ is a methyl group and the other is a methoxy group, or
$R^1$ and $R^2$, together with a nitrogen atom to which $R^1$ and $R^2$ are bonded, form a group of the following formula:

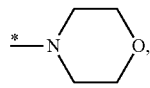

wherein * is a bond.

[8] A method for producing a fluoropolyether group-containing compound comprising:
the compound of formula (1a) or (1b) according to [1] and a compound of the following formula (2c):

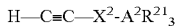 (2c)

are added with an organic lithium to obtain the fluoropolyether group-containing compound of formula (2a) or formula (2b):

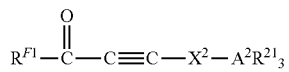 (2a)

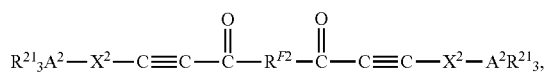 (2b)

wherein
in formula (2c),
$X^2$ is a divalent organic group;
$A^2$ is each independently at each occurrence C or Si; and
$R^{21}$ is each independently a hydrocarbon group having at least one carbon-carbon double bond,
in formula (2a) or formula (2b),
$R^{F1}$ and $R^{F2}$ have the same meaning as [1];
$X^2$, $A^2$, and $R^{21}$ are the same as $X^2$, $A^2$, and $R^{21}$ of formula (2c), respectively.

[9] A fluoropolyether group-containing compound of formula (2a) or formula (2b):

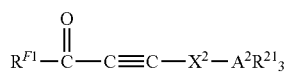 (2a)

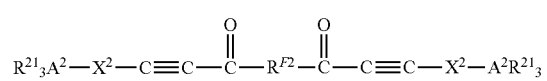 (2b)

wherein
$R^{F1}$ and $R^{F2}$ have the same meaning as [1];
$X^2$ is a divalent organic group;
$A^2$ is each independently at each occurrence C or Si; and
$R^{21}$ is a hydrocarbon group having at least one carbon-carbon unsaturated bond.

[10] A method for producing a fluoropolyether group-containing compound comprising reducing the compound of formula (1a) or (1b) according to [1] in the presence of an alkyllithium to obtain the fluoropolyether group-containing compound of formula (4a) or formula (4b):

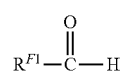 (4a)

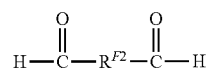 (4b)

wherein $R^{F1}$ and $R^{F2}$ have the same meaning as [1]

[11] A fluoropolyether group-containing compound of formula (4a) or formula (4b):

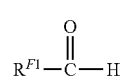 (4a)

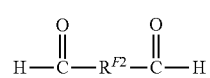 (4b)

wherein $R^{F1}$ and $R^{F2}$ have the same meaning as [1].

[12] A method for producing a fluoropolyether group-containing compound comprising reacting a fluoropolyether group-containing compound of formula (4a) or (4b):

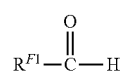 (4a)

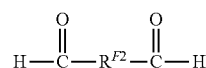 (4b)

with dimethyl (1-diazo-2-oxopropyl)phosphonate to obtain the fluoropolyether group-containing compound of formula (3a) or formula (3b):

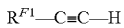 (3a)

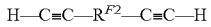 (3b)

wherein $R^{F1}$ and $R^{F2}$ have the same meaning as [1][13] A fluoropolyether group-containing compound of formula (3a) or formula (3b):

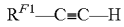 (3a)

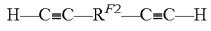 (3b)

wherein $R^{F1}$ and $R^{F2}$ have the same meaning as [1]

[14] A fluoropolyether group-containing compound of formula (5a) or formula (5b):

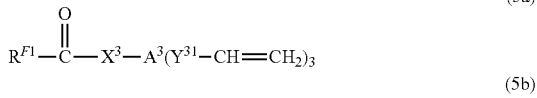

(5a)

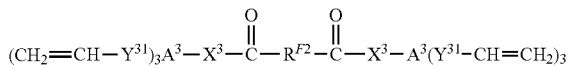

(5b)

wherein
$R^{F1}$ and $R^{F2}$ have the same meaning as [1];
$X^3$ is a divalent organic group;
$A^3$ is each independently at each occurrence C or Si; and
$Y^{31}$ is a divalent organic group.

EXAMPLES

Hereinafter, the present disclosure will be described with reference to, but is not limited to, Examples. In this Examples, all the chemical formulas shown below represent average compositions, "Me" represents $CH_3$, and "Boc" represents a tert-butoxycarbonyl group.

(Example 1) Synthesis of Weinreb Amide

To 18 mL of simply dehydrated m-xylene hexafluoride (mXHF), 10.9 g (2.73 mmol) of $CF_3CF_2CF_2$ $(OCF_2CF_2CF_2)_n$ $OCF_2CF_2COOH$ (n is 25) was dissolved, and then 40 µl (0.514 mmol) of dimethylformamide (DMF) and 1.4 mL (19.3 mmol) of thionyl chloride were sequentially added to the solution, followed by stirring at room temperature for 10 minutes. Thereafter, the container containing the reaction solution was placed in an oil bath and stirred at 100° C. for 5 hours. After 5 hours, the resulting reaction solution was concentrated to dryness to obtain the acid chloride $CF_3CF_2CF_2$ $(OCF_2CF_2CF_2)_n OCF_2CF_2COCl$.

The acid chloride thus obtained was dissolved in a mixed solvent of 16 mL of simply dehydrated AK 225 (manufactured by AGC Inc.) and 6 mL of dehydrated chloroform, and a hydrochloride salt of N,O-dimethylhydroxyamine was added to this solution. Subsequently, at room temperature, 2.7 mL (33.5 mmol) of pyridine was added dropwise over 10 minutes, and the above solution was stirred at 60° C. for 2 days. After 2 days, the resulting reaction solution was washed twice with 10 mL of 1 N HCl followed by one wash with 10 mL of water. The washed reaction solution was filtered through a Kiriyama funnel packed with silica gel in 2 cm, and the filtrate was concentrated to dryness. The product obtained by concentration to dryness was dissolved in 10 mL of AK 225, and the solution was then filtered through a filter. The filtrate was concentrated to dryness to obtain 10.15 g of Weinreb amide represented by the following formula (yield 93%).

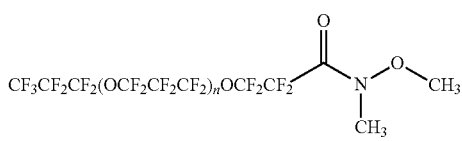

(n is 25)
$^1$H NMR (mXHF, 400 MHz) δ: 3.55 (s, 3H), 4.06 (s, 3H);
$^{19}$F NMR (mXHF, 400 MHz) δ: −84.14--−84.16, −85.60--−85.89, −86.60, −120.44, −131.39--−131.49, −132.40

(Example 2) Synthesis of Morpholine Amide

To 2.2 g (0.55 mmol) of a methyl ester represented by $CF_3CF_2CF_2$ $(OCF_2CF_2CF_2)_nOCF_2CF_2COOCH_3$ (n is 25), 0.479 g (5.5 mmol) of morpholine was added, and the mixture was stirred for 30 minutes under reduced pressure. Then, the mixture was stirred at room temperature for 3 days in 3 mL of simplified dehydrated AK 225. After 3 days, the resulting reaction solution was washed with 10 mL of 3.5 N HCl followed by one wash with 10 mL of water. After washing with water, the product was dried using 20 g of sodium sulfate, and then filtered through a Kiriyama funnel. The filtrate was concentrated to dryness to obtain 2.274 g of morpholine amide represented by the following formula (yield: 100%).

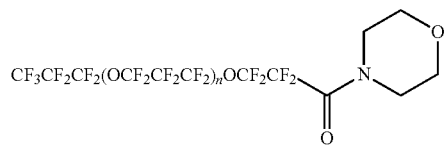

(n is 25)
$^1$H NMR (mXHF, 400 MHz) δ: 3.95 (m, 4H), 3.99 (m, 4H);
$^{19}$F NMR (mXHF, 400 MHz) δ: −84.13--−84.17, −85.00--−86.50, −86.93, −116.94, −131.39--−131.50, −132.41.

Example 3

(Synthesis Example 3-1) Synthesis of Aldehyde

To 10 mL of simply dehydrated hydrofluoroether (Novec HFE-7200, manufactured by 3M), 4.54 g (1.14 mmol) of Weinreb amide obtained in Example 1 was dissolved, and then the reaction solution was cooled to −78° C. Subsequently, 2.38 mL (2.38 mmol) of 1 mol/L diisobutylaluminum hydride (DIBAL-H) was slowly added dropwise over 30 minutes, and then the reaction solution was stirred for 8.5 hours while being naturally warmed from −78° C. to room temperature. After 8.5 hours, 10 mL of 1N HCl was added to the reaction solution, and after stirring for 30 minutes, the aqueous phase was removed by separation.

Thereafter, HFE 7200 phase was washed with 10 mL of water and 10 mL of saturated saline and dried with 30 g of sodium sulfate thereafter. Subsequently, the dried HFE 7200 solution was filtered using a Kiriyama funnel and then concentrated to dryness. In 10 mL of perfluorohexane, 4.9 g of the product obtained by concentration to dryness was dissolved, and the solution was washed with 10 mL of 1N HCl and 10 mL of water in this order. Subsequently, the perfluorohexane solution was washed with 10 mL of methanol and 10 mL of chloroform in this order. The washed perfluorohexane solution was concentrated to dryness to obtain 4.39 g of aldehyde represented by the following formula (yield 97%).

(n is 25)

$^{19}$F NMR (mXHF, 400 MHz) δ: −83.62–−83.70, −84.12–−84.26, −85.45–−85.97, −86.58–−86.73, −128.16–−128.27, −128.51–−128.61, −131.48–−132.00, −132.40

(Synthesis Example 3-2) Synthesis of Alkynes

In a mixed solvent of 3 mL of simply dehydrated HFE 7200 and 1.5 mL of dehydrated methanol, 2 g (0.5 mmol) of aldehyde obtained in Synthesis Example 3-1 was dissolved, and then 0.306 g (2.22 mmol) of potassium carbonate was added thereto. Subsequently, 0.2 ml (1.33 mmol) of Ohira-Bestmann reagent was added and stirred overnight at room temperature. The next morning, 20 mL of perfluorohexane was added to the reaction solution, and the mixture was washed twice with 10 mL of chloroform. The washed reaction solution was filtered using a Kiriyama funnel packed with silica gel in 2 cm, and the filtrate was concentrated to dryness to obtain 2 g of alkyne represented by the following formula (yield: 100%).

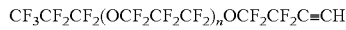

CF$_3$CF$_2$CF$_2$(OCF$_2$CF$_2$CF$_2$)$_n$OCF$_2$CF$_2$C≡CH (n is 25)

$^1$H NMR (mXHF, 400 MHz) δ: 3.16 (t, 1H);
$^{19}$F NMR (mXHF, 400 MHz) δ: −84.12–−84.16, −85.59–−85.96, −86.90, −89.99, −105.58, −131.40–−131.63, −132.39

Synthesis Example 3-3

After suspending 3.92 g (60.3 mmol) of sodium azide in 6 mL of dehydrated acetonitrile, the reaction solution was cooled to 0° C. After cooling, 1.4 mL (13.3 mmol) of trifluoromethanesulfonyl chloride was added dropwise to the solution over 10 minutes, and the solution was stirred in an ice bath for 3 hours. After 3 hours, 20 mL of dichloromethane and 10 mL of water was added to the reaction solution and stirred for 5 minutes. After 5 minutes, the dichloromethane phase was extracted and washed again with 10 mL of water to obtain a dichloromethane solution of trifluoromethanesulfonyl azide.

After dissolving 1.1 g (6.65 mmol) of H$_2$NCH$_2$C(CH$_2$CH=CH$_2$)$_3$ and 1.38 g (9.98 mmol) of potassium carbonate in a mixed solvent of 40 mL of methanol and 20 mL of water, 0.166 g (0.665 mmol) of copper sulfate pentahydrate was added thereto. Subsequently, a dichloromethane solution of the trifluoromethanesulfonyl azide synthesized above was added dropwise to the solution over 10 minutes, and the solution was stirred at room temperature for 2 hours. After 2 hours, the reaction solution was washed with 10 mL of saturated aqueous ammonium chloride solution and 10 mL of water, and concentrated to dryness. The product obtained by concentration to dryness was dissolved in a mixed solvent of 1 mL of ethyl acetate and 10 mL of hexane, and the solution was filtered through a Kiriyama funnel packed with silica gel in 2 cm, and the filtrate was concentrated to dryness to obtain 1.06 g of a compound represented by the following formula (yield: 84%).

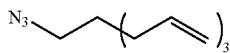

$^1$H NMR (CDCl$_3$, 400 MHz) δ: 2.00-2.05 (m, 6H), 3.16 (s, 2H), 4.90-5.15 (m, 6H), 5.73-5.90 (m, 3H)

(Synthesis Example 3-4) Synthesis of Triazole

In a mixed solvent containing 3 mL of AK 225, 1.5 mL of dimethyl sulfoxide (DMSO), and 0.5 mL of water, 1.3827 g (0.346 mmol) of the alkyne obtained in Synthesis Example 3-2 was dissolved. To the resulting solution was added 0.132 g (0.691 mmol) of the compound obtained in Synthesis Example 3-3, 0.0137 g (0.0691 mmol) of sodium L-ascorbate, and 0.0086 g (0.0346 mmol) of copper sulfate pentahydrate in this order, and the mixture was stirred at room temperature overnight. The next morning, 10 mL of AK 225 was added to the reaction solution, washed with 10 mL of water, and concentrated to dryness. The product obtained by concentration to dryness was dissolved in 20 mL of perfluorohexane, washed twice with 10 mL of chloroform, and dried using 10 g of sodium sulfate. Subsequently, the solution was filtered through a Kiriyama funnel, and the filtrate was concentrated to dryness and purified by flash column chromatography using silica gel to obtain 0.883 g of triazole represented by the following formula (yield: 64%).

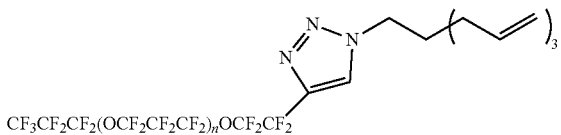

CF$_3$CF$_2$CF$_2$(OCF$_2$CF$_2$CF$_2$)$_n$OCF$_2$CF$_2$ (n is 25)

$^1$H NMR (mXHF, 400 MHz) δ: 2.35-2.40 (m, 6H), 4.57 (s, 2H), 5.42-5.54 (m, 6H), 6.16-6.27 (m, 3H)
$^{19}$F NMR (mXHF, 400 MHz) δ: −84.12–−84.16, −85.50–−86.00, −86.58, −−86.59, −89.04–−89.11, −114.53, −131.39–−131.96, −132.39

(Synthesis Example 3-5) Hydrosilylation of Triazole

In 1.2 mL of simply dehydrated mXHF, 0.883 g (0.221 mmol) of triazole obtained in Synthesis Example 3-4 was dissolved, and then 60 μl (0.277×10$^{-2}$ mmol) of Karstedt catalyst and 10 μl (0.11 mmol) of aniline were added thereto in this order. After stirring at room temperature for 30 minutes, 0.2 mL (1.57 mmol) of trimethoxysilane was added to the reaction solution and stirred at room temperature for 2 hours. After 2 hours, 1.5 mL of simply dehydrated HFE 7200 was added. To the reaction solution was added 0.04 g of activated carbon and stirred at room temperature for 30 minutes. After 30 minutes, filter filtration was performed, and the filtrate was concentrated to dryness to obtain 0.93 g of hydrosilyl triazole represented by the following formula (yield: 100%).

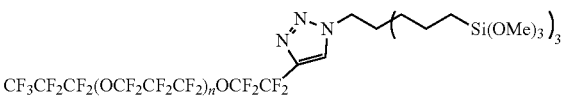

CF$_3$CF$_2$CF$_2$(OCF$_2$CF$_2$CF$_2$)$_n$OCF$_2$CF$_2$ (n is 25)

$^1$H NMR (mXHF, 400 MHz) δ: 0.96-1.00 (m, 6H), 1.55-1.65 (m, 6H), 1.90-1.98 (m, 6H), 4.57 (s, 2H)
$^{19}$F NMR (mXHF, 400 MHz) δ: −84.14–−84.16, −85.50–−86.00, −86.58, −−86.59, −88.59–−88.64, −114.50–−114.30, −131.39–−131.96, −132.39

Synthesis Example 4

(Synthesis Example 4-1) Synthesis of Vinyl

After 0.263 g (0.65 mmol) of methyltriphenylphosphonium iodide was dissolved in 3 mL of dehydrated tetrahydrofuran (THF), 0.073 g (0.65 mmol) of potassium tert-butoxide (t-BuOK) was added thereto, and the mixture was stirred at room temperature for 1 hour. After 1 hour, 1.3 g (0.325 mmol) of the aldehyde obtained in Synthesis Example 3-1 was added and stirred at room temperature overnight. The next morning, 20 mL of perfluorohexane was added to the reaction solution, washed twice with 10 mL of water, and then washed with 10 mL of methanol. Subsequently, the reaction solution was washed twice with 10 mL of chloroform, filtered through a Kiriyama funnel packed with silica gel in 2 cm, and extracted with 60 mL of perfluorohexane. Finally, the solution was concentrated to dryness to obtain 0.851 g of vinyl represented by the following formula (yield: 66%).

CF$_3$CF$_2$CF$_2$(OCF$_2$CF$_2$CF$_2$)$_n$OCF$_2$CF$_2$ (n is 25)

$^1$H NMR (mXHF, 400 MHz) δ: 6.00-6.03 (m, 1H), 6.28 (d, 2H);

$^{19}$F NMR (mXHF, 400 MHz) δ: −84.13, −85.60--86.00, −86.50, −120.26, −131.40--131.89, −132.40.

Example 5

Synthesis Example 5-1

After suspending 3.6 g (21.7 mmol) of HOCH$_2$C (CH$_2$CH=CH$_2$)$_3$ and 36 g of activated molecular sieves 4 Å in 50 mL of dichloromethane, 12.21 g (32.5 mmol) of pyridinium dichromate (PDC) was added in three portions. After stirring for 5 hours at room temperature, the solution was filtered using a Kiriyama funnel packed with silica gel in 2 cm, and the filtrate was concentrated to dryness to obtain 3.47 g of a compound represented by the following formula (yield: 98%).

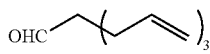

$^1$H NMR (CDCl$_3$, 400 MHz) δ: 2.26-2.29 (m, 6H), 5.00-5.11 (m, 6H), 5.66-5.80 (m, 3H), 9.52 (s, 1H).

(Synthesis Example 5-2) Synthesis of Methoxy Compound

In 60 mL of tetrahydrofuran (THF), 17.5 g (51.1 mmol) of methoxymethyltriphenylphosphonium chloride was dissolved. Thereafter, 6.5 g (58.0 mmol) of potassium tert-butoxide (t-BuOK) was added and the solution was stirred at room temperature for 1 hour. After 1 hour, 5.6 g (34.1 mmol) of the compound obtained in Synthesis Example 5-1 was added and the solution was stirred at room temperature for 4 hours. After 4 hours, 120 mL of ethyl acetate was added to the reaction solution, washed twice with 40 mL of water, and dried with 30 g of sodium sulfate. The dried solution was then filtered through a Kiriyama funnel, and the filtrate was concentrated to dryness. Thereafter, the mixture was purified by flash column chromatography using silica gel to obtain 6.26 g of a methoxy compound (E form is represented by the following formula) as a mixture of an E form and a Z form (yield: 95%).

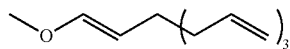

$^1$H NMR (CDCl$_3$, 400 MHz) δ: 2.05-2.09 (m, 6H), 2.20-2.25 (m, 6H), 3.50-3.54 (m, 6H), 3.99-4.02 (m, 1H), 4.60-4.67 (m, 1H), 5.00-5.10 (m, 12H), 5.75-5.80 (m, 6H), 6.15-6.19 (m, 1H)

(Synthesis Example 5-3) Synthesis of Aldehyde

In 6 mL of THF, 1.26 g (6.55 mmol) of the methoxy compound obtained in Synthesis Example 5-2 was dissolved, 3 mL of 6N HCl was added thereto, and the solution was stirred at room temperature for 7 hours. After 7 hours, to the reaction solution was added 20 mL of a mixed solution of ethyl acetate and hexane (ethyl acetate:hexane=1:4), washed twice with 100 mL of water, and dried using 20 g of sodium sulfate. Subsequently, the dried solution was filtered through a Kiriyama funnel, and the filtrate was concentrated to dryness to obtain 1.04 g of a compound represented by the following formula in which the number of carbon atoms was increased by one (yield: 97%).

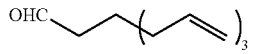

$^1$H NMR (CDCl$_3$, 400 MHz) δ: 2.15-2.17 (m, 6H), 2.30 (s, 2H), 5.00-5.13 (m, 6H), 5.76-5.90 (m, 3H), 9.84 (s, 1H).

(Synthesis Example 5-4) Synthesis of Carboxylic Acid

In 10 mL of dehydrated methanol, 0.59 g (3.31 mmol) of the compound obtained in Synthesis Example 5-3 was dissolved, 2.02 g (14.6 mmol) of potassium carbonate and 1.09 mL (7.29 mmol) of Ohira-Bestmann reagent were added thereto in this order, and the mixture was stirred at room temperature for 3 hours. After 3 hours, 20 mL of diethyl ether was added to the reaction solution, washed twice with 100 mL of water, washed with 10 mL of saturated saline, and dried over 20 g of sodium sulfate. The solution was then filtered through a Kiriyama funnel, and the filtrate was concentrated to dryness. The residue was dissolved in 40 mL of hexane, and the solution was filtered through a Kiriyama funnel packed with silica gel in 3 cm, and the filtrate was concentrated to dryness to obtain 0.6 g of a compound represented by the following formula (yield: 100%).

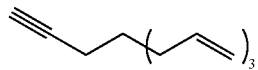

$^1$H NMR (CDCl$_3$, 400 MHz) δ: 1.99 (s, 1H), 2.00-2.15 (m, 8H), 5.00-5.20 (m, 6H), 5.75-5.85 (m, 3H)

(Synthesis Example 5-5) Synthesis of Alkynone

In 3 mL of dehydrated THF, 0.2 g (1.15 mmol) of the compound obtained in Synthesis Example 5-4 was dissolved, the solution was immersed in an ice bath containing dry ice and acetone, and the internal temperature was cooled to −78° C. After cooling, 0.795 mL (1.32 mmol) of n-BuLi (1.66 mol/L) was added dropwise to the solution over 10 minutes, and the solution was stirred for 1 hour with a natural warming. After 1 hour, the internal temperature was cooled again to −78° C., and a solution in which 2.3 g (0.574 mmol) of Weinreb amide obtained in Example 1 was dissolved in 2 mL of simply dehydrated HFE 7200 was added dropwise over 5 minutes. After dropwise adding, the mixture was stirred overnight with a natural warming. The next morning, 20 mL of perfluorohexane and 20 mL of 1N HCl were added to the reaction solution, and after stirring for 30 minutes, the aqueous phase was removed by separation. Subsequently, the perfluorohexane phase was washed with 10 mL of water, washed with 10 mL of methanol, washed twice with 10 mL of chloroform, and concentrated to dryness. The product obtained after the concentration was dissolved in 160 mL of a mixture of perfluorohexane: mXHF=10:1. The solution was filtered through a Kiriyama funnel packed with silica gel in 3 cm, and the filtrate was concentrated to dryness to obtain 0.997 g of alkynone represented by the following formula (yield: 43%).

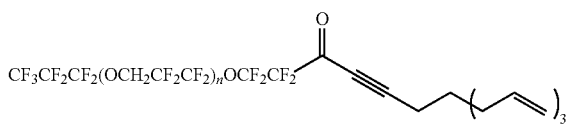

(n is 25)
$^1$H NMR (mXHF, 400 MHz) δ: 2.40-2.50 (m, 6H), 2.67 (s, 2H), 5.40-5.47 (m, 6H), 6.07-6.20 (m, 3H);
$^{19}$F NMR (mXHF, 400 MHz) δ: −83.98−−84.25, −85.40−−85.60, −86.58, −87.22, −123.66, −131.35−−131.66, −132.39

(Synthesis Example 5-6) Synthesis of Oxime

After 0.5 g (0.125 mmol) of the alkynone obtained in Synthesis Example 5-5 was dissolved in 3 mL of AK 225 and 2 mL of DMSO, 0.087 g (1.25 mmol) of hydroxylamine hydrochloride and 0.103 g (1.25 mmol) of sodium acetate were added in this order, and the mixture was stirred overnight at a bath temperature of 43° C. The next morning, the mixture was washed twice with 10 mL of water, and then dried with 20 g of sodium sulfate. Subsequently, the solution was filtered through a Kiriyama funnel and concentrated to dryness to obtain 0.51 g of a crude oxime (Z form is a compound represented by the following formula) as a mixture of an E form and a Z form (yield: 100%).
The resulting crude oxime was used in the following reaction without purification.

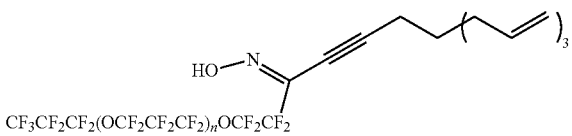

(n is 25)
$^1$H NMR (mXHF, 400 MHz) δ: 2.40-2.50 (m, 6H), 2.65 (s, 2H), 5.40-5.50 (m, 6H), 6.10-6.25 (m, 3H), 7.00 (s, 1H).

(Synthesis Example 5-7) Synthesis of Cyclized Product

After dissolving 0.68 g (0.17 mmol) of the crude oxime obtained in Synthesis Example 5-6 in 3 mL of simply dehydrated AK 225 and 0.5 mL of super-dehydrated chloroform, 0.0052 g (0.017 mmol) of AuCl$_3$ was added thereto, and the mixture was stirred at room temperature overnight. The next morning, the mixture was washed with 10 mL of water, and then dried with 20 g of sodium sulfate. Subsequently, the solution was dissolved in 5 mL of mXHF, filtered through a Kiriyama funnel packed with silica gel in 3 cm, extracted with 60 mL of mXHF, and the filtrate was concentrated to dryness to obtain 0.41 g of a cyclized product represented by the following formula (yield: 60%).

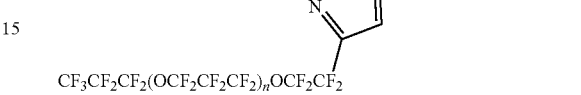

(n is 25)
$^1$H NMR (mXHF, 400 MHz) δ: 2.37-2.50 (m, 6H), 3.00 (s, 2H), 5.40-5.46 (m, 6H), 6.10-6.30 (m, 3H), 7.00 (s, 1H);
$^{19}$F NMR (mXHF, 400 MHz) δ: −84.15−−84.17, −85.00−−86.00, −87.00, −88.55, −117.50−−117.70, −131.27−−131.98, −132.42.

(Synthesis Example 5-8) Hydrosilylation of Cyclized Product

After 0.4 g (0.1 mmol) of the cyclized product obtained in Synthesis Example 5-7 was dissolved in 0.6 mL of simply dehydrated mXHF, 11 µl (0.5×10$^{-3}$ mmol) of Karstedt catalyst and 3.6 µl (0.04 mmol) of aniline were added thereto in this order. After stirring at room temperature for 30 minutes, 0.102 mL (0.8 mmol) of trimethoxysilane was added and stirred at room temperature for 3 hours. After 3 hours, 0.6 mL of simply dehydrated HFE 7200 was added. To the reaction solution was added 0.076 g of activated carbon and stirred at room temperature for 30 minutes. After 30 minutes, the mixture was filtered through a filter and concentrated to dryness to obtain 0.38 g of hydrosilyl isoxazole represented by the following formula (yield: 95%).

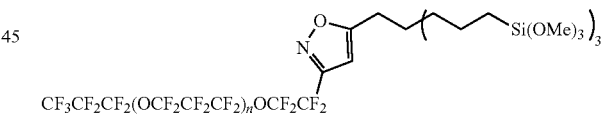

(n is 25)
$^1$H NMR (mXHF, 400 MHz) δ: 0.98-1.08 (m, 6H), 1.60-1.77 (m, 6H), 1.91-1.95 (m, 6H), 2.96 (s, 2H), 3.90-4.10 (m, 27H), 7.21 (s, 1H);
$^{19}$F NMR (mXHF, 400 MHz) δ: −84.00, −85.00−−86.00, −88.52, −117.36, −131.40−−131.69, −132.42.

As described above, the compound obtained in Example 1 can be used as a reaction raw material for various compounds as shown in Examples 3 and 5 and Synthetic Example 4. The compound obtained in Example 2 can also be used as a reaction raw materials for various compound as in Example 1.

INDUSTRIAL APPLICABILITY

The fluoropolyether group-containing compound represented by formula (1a) or (1b) of the present disclosure is useful as an intermediate for various reactions.

What is claimed is:

1. A method for producing a fluoropolyether group-containing compound comprising:
a compound of the following formula (1a) or (1b):

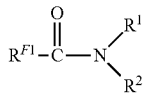 (1a)

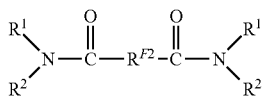 (1b)

and a compound of the following formula (2c):

$$H—C≡C—X^2\text{-}A^2R^{21}{}_3 \quad (2c)$$

are added with an organic lithium to obtain the fluoropolyether group-containing compound of formula (2a) or formula (2b):

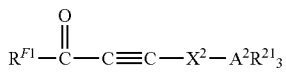 (2a)

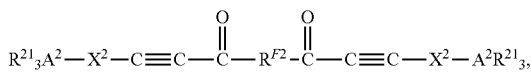 (2b)

wherein
$R^{F1}$ is each independently at each occurrence $Rf^1$—$R^F$—$O_q$—;
$R^{F2}$ is —$Rf^2{}_p$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1; and
$R^1$ and $R^2$, each independently at each occurrence, are an alkyl group or an alkoxy group having 1 to 10 carbon atoms, or together form a group having a ring structure which is a 5 to 10-membered heterocyclic ring, or together form a group having a ring structure which is a condensed ring containing a 5 to 10-membered heterocyclic ring, wherein the alkyl group, the alkoxy group and the group having the ring structure may be substituted;
$X^2$ is a divalent organic group;
$A^2$ is each independently at each occurrence C or Si; and
$R^{21}$ is each independently a hydrocarbon group having at least one carbon-carbon double bond.

2. A method for producing a fluoropolyether group-containing compound comprising reducing a compound of the following formula (1a) or (1b) in the presence of an alkyllithium to obtain the fluoropolyether group-containing compound of formula (4a) or formula (4b):

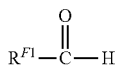 (4a)

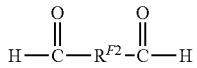 (4b)

wherein
$R^{F1}$ is each independently at each occurrence $Rf^1$—$R^F$—$O_q$—;
$R^{F2}$ is —$Rf^2{}_p$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1.

3. A method for producing a fluoropolyether group-containing compound comprising reacting a fluoropolyether group-containing compound of formula (4a) or (4b):

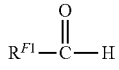 (4a)

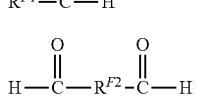 (4b)

with dimethyl (1-diazo-2-oxopropyl)phosphonate to obtain the fluoropolyether group-containing compound of formula (3a) or formula (3b):

$$R^{F1}—C≡C—H \quad (3a)$$

$$H—C≡C—R^{F2}—C≡C—H \quad (3b)$$

wherein
$R^{F1}$ is each independently at each occurrence $Rf^1$—$R^F$—$O_q$—;
$R^{F2}$ is —$Rf^2{}_p$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1
the fluoropolyether group-containing compound of formula (4a) or (4b) is obtained according to claim 2.

4. The method for producing a fluoropolyether group-containing compound according to claim 1, wherein $R^F$ is each independently at each occurrence a group represented by formula:

$$—(OC_6F_{12})_a—(OC_5F_{10})_b—(OC_4F_8)_c—(OC_3F_6)_d—(OC_2F_4)_e—(OCF_2)_f—$$

wherein
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

5. The method for producing a fluoropolyether group-containing compound according to claim 1,
wherein
$R^1$ and $R^{2'}$ each independently at each occurrence, are an alkyl group or an alkoxy group having 1 to 10 carbon atoms, or together form a group having a heterocyclic ring structure, wherein the ring structure contains 2 to 10 carbon atoms.

6. The method for producing a fluoropolyether group-containing compound according to claim 1,
wherein
$R^1$ and $R^{2'}$ each independently at each occurrence, are a $C_{1-10}$ alkyl group or a $C_{1-10}$ alkoxy group, together form a group having a ring structure, wherein the ring structure is a 5 to 10-membered heterocyclic ring, or together form a group having a condensed ring, wherein the condensed ring contains a 5 to 10-membered heterocyclic ring and a 3 to 10-membered ring other than the heterocyclic ring.

7. The method for producing a fluoropolyether group-containing compound according to claim 1, wherein
$R^1$ and $R^{2'}$ each independently, are a $C_{1-10}$ alkoxy group or a $C_{1-10}$ alkyl group, or
$R^1$ and $R^{2'}$ together with a nitrogen atom to which they are bonded, form a group of the following formula:

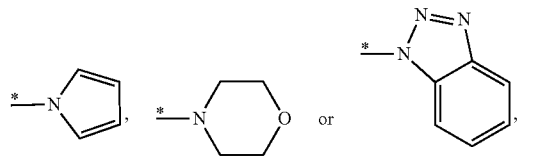

wherein * is a bond.

8. The method for producing a fluoropolyether group-containing compound according to claim 1, wherein
one of $R^1$ and $R^2$ is a methyl group and the other is a methoxy group, or
$R^1$ and $R^{2'}$ together with a nitrogen atom to which $R^1$ and $R^2$ are bonded, form a group of the following formula:

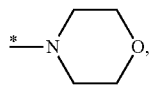

wherein * is a bond.

9. The method for producing a fluoropolyether group-containing compound according to claim 2, wherein $R^F$ is each independently at each occurrence a group represented by formula:

$$-(OC_6F_{12})_a-(OC_5F_{10})_b-(OC_4F_8)_c-(OC_3F_6)_d-(OC_2F_4)_e-(OCF_2)_f-$$

wherein a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

10. The method for producing a fluoropolyether group-containing compound according to claim 3, wherein $R^F$ is each independently at each occurrence a group represented by formula:

$$-(OC_6F_{12})_a-(OC_5F_{10})_b-(OC_4F_8)_c-(OC_3F_6)_d-(OC_2F_4)_e-(OCF_2)_f-$$

wherein
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

* * * * *